United States Patent

Godard et al.

[11] Patent Number: 6,055,346
[45] Date of Patent: Apr. 25, 2000

[54] FIBRE OPTIC DEVICE FOR HOMOGENIZING A LASER BEAM

[75] Inventors: Bruno Godard, Les Ulis; Robert Stehle, La Garenne, both of France

[73] Assignee: Societe de Production et de Recherches Appliquees, Bois-Colombes, France

[21] Appl. No.: 09/000,111

[22] PCT Filed: Aug. 6, 1996

[86] PCT No.: PCT/FR96/01252

§ 371 Date: Jan. 23, 1998

§ 102(e) Date: Jan. 23, 1998

[87] PCT Pub. No.: WO97/07424

PCT Pub. Date: Feb. 27, 1997

[30] Foreign Application Priority Data

Aug. 11, 1995 [FR] France .................................. 95 09781

[51] Int. Cl.[7] .................................................... G02B 6/32
[52] U.S. Cl. ................... 385/33; 385/17; 385/15; 385/24; 385/27; 359/623; 359/619
[58] Field of Search .................... 385/33, 15–24, 385/27, 31, 39–48; 359/619, 623

[56] References Cited

U.S. PATENT DOCUMENTS 5,253,110 10/1993 Ichihara et al. ...................... 359/619
5,414,559 5/1995 Burghardt et al. .................... 359/623

FOREIGN PATENT DOCUMENTS

| 0097250 | 1/1984 | European Pat. Off. . |
|---|---|---|
| 0266120 | 5/1988 | European Pat. Off. . |
| 9509778 | of 0000 | France . |
| 2737806 | 2/1997 | France . |
| 2737814 | 2/1997 | France . |
| 4220705 | 1/1994 | Germany . |
| 01286478 | 11/1989 | Japan . |

*Primary Examiner*—Phan T. H. Palmer
*Attorney, Agent, or Firm*—Christie, Parker & Hale, LLP

[57] ABSTRACT

An optical device for homogenizing a laser beam includes a plurality of abutting front lenses ($LF_{nm}$) for dividing the laser beam to be homogenized into m×n laser beams, each having a substantially uniform cross section, and a substantially homogeneous energy distribution; a first intermediate plane (PI1) located in the focal plane of the front lenses ($LF_{mn}$) and having a plurality of entrance pupils ($PE_{ij}$) each of which is arranged at the focus of a front lens ($LF_{mn}$) selected among said plurality of front lenses ($LF_{mn}$); a second intermediate plane (PI2) having a plurality of exit pupils ($PS_{ij}$), a collection lens (LC) capable of collecting the beams from the plurality of exit pupils ($PS_{ij}$); and optical transmission means for individually transmitting the light beams from the plurality of entrance pupils ($PS_{ij}$) to the plurality of exit pupils ($PS_{kj}$).

12 Claims, 6 Drawing Sheets

FIBRE OPTIC DEVICE FOR HOMOGENIZING A LASER BEAM

BACKGROUND OF THE INVENTION

The present invention concerns a fibre optic device for homogenizing a laser beam.

It finds a general application in any technical field using a laser, and notably in laser surface treatment, such as the annealing of amorphous silicon, cleaning, polishing and surface preparation.

In general terms, the energy distribution across the cross section of a laser beam, at least in the lowest type of emission, has a gaussian appearance, which is in any case variable across the cross section of the beam.

However, in order to obtain, for example, an optimum annealing of amorphous silicon, it is necessary to apply a laser beam having a homogeneous and substantially uniform energy distribution.

This homogeneity is particularly required when the sample to be treated by laser is of large size (as described in the French Patent Application entitled "Device and method for laser surface treatment" filed in the name of the Applicant on Aug. 11, 1995 under the number 95 09778, and the disclosure of which is incorporated herein by reference. It is also required when the incident laser beam is a combination of several laser beams coming from a line of laser units arranged in parallel and/or in series (as described in the French Patent Application entitled "Method and device for controlling a laser source with several laser units for optimizing laser surface treatment", filed by the Applicant on Aug. 11, 1995 under the number 95 09780, and the disclosure of which is incorporated herein by reference.

Means are already known for homogenizing a laser beam (JP-A-01 286 478, U.S. Pat. No. 5,253,110, EP-A-0 266 120, DE-A-4 220 705 and EP-A-0 097 250).

However, these means are usually complicated, expensive, difficult to implement and ill-suited to beams of large size and high power.

The present invention affords precisely a solution to this problem.

SUMMARY OF THE INVENTION

It relates to an optical-fibre device for treating an entrance laser beam comprising:

- a matrix of m×n contiguous convergent front lenses disposed in m rows and n columns, on a plane perpendicular to the direction of propagation of the entrance laser beam and suitable for dividing the said entrance laser beam into m×n elementary laser beams each having an elementary transverse section of chosen geometric shape and a spatial distribution of the light intensity which is substantially homogenous in the elementary section, and
- at least one convergent collection lens disposed perpendicularly to the direction of propagation of the entrance laser beam, downstream of the front lenses in the direction of travel of the entrance laser beam, the said collection lens then being suitable focusing, in a chosen plane, the elementary beams coming from the front lenses, with a view to obtaining an exit beam having a desired spatial distribution of the energy density.

According to a general definition of the invention, the device also comprises:

- a plurality of optical fibres each comprising a first end and a second end opposite the first, the first optical fibre ends being disposed in a first matrix arrangement of i rows and j columns in a first intermediate plane, formed by the focal plane of the front lenses, with each of the first optical fibre ends substantially situated at the focal point of a respective front lens, whilst the second optical fibre ends being disposed in a second bidimensional arrangement of chosen distribution in a second intermediate plane situated downstream of the said focal plane of the front lenses, the first and second optical fibre ends constituting respectively entrance pupils and exit pupils and the collection lens, disposed downstream of the second intermediate plane, being able to collect the elementary beams coming from the plurality of exit pupils.

The optical fibres are thus able to transfer a plurality of homogeneous elementary portions of the laser energy. In the case of a high-power laser, the device according to the invention thus makes it possible to divide and transfer a laser energy into a plurality of homogeneous elementary portions of low-power energy. There is a resulting elimination of the damage which may be caused by the effects of a high-power laser, notably on the optical elements of the device according to the invention.

Such a device also makes it possible to obtain an exit beam which is homogeneous in the close field.

It finds an advantageous application when the entrance beam to be treated is a combination of several laser beams emanating from a line of laser units put in parallel and/or in series.

For example, the optical fibres have a diameter of around 125 μm and a length less than 1 m. In a variant, they have a length greater than 1 m.

In practice, the second bidimensional arrangement corresponds to a matrix of k rows and l columns.

According to another aspect of the invention, the plurality of optical fibres of indices i, j transmitting the laser beams coming from the front lenses are able to distribute them in a distribution of indices k, l where at least some of the indices k and l are different from the indices i and j. In a variant, the indices i and j are respectively equal to the indices k and l.

According to another embodiment of the invention, the device also comprises a third intermediate plane, disposed downstream of the second intermediate plane, having a plurality of contiguous additional front lenses, disposed in q rows and r columns, perpendicularly to the direction of propagation of the elementary laser beams coming from the plurality of exit pupils, and suitable for receiving the said elementary laser beams coming from the plurality of exit pupils and to divide them each into q.r additional elementary laser beams each having an additional elementary transverse section of chosen geometric shape, and an energy distribution which is substantially homogenous in the additional elementary section; the collection lens being suitable for collecting, in a chosen plane, the additional elementary laser beams coming from the additional front lenses.

Other advantages and characteristics of the invention will emerge in the light of the following detailed description and the drawings.

DETAILED DESCRIPTION OF THE INVENTION

Figure 1:
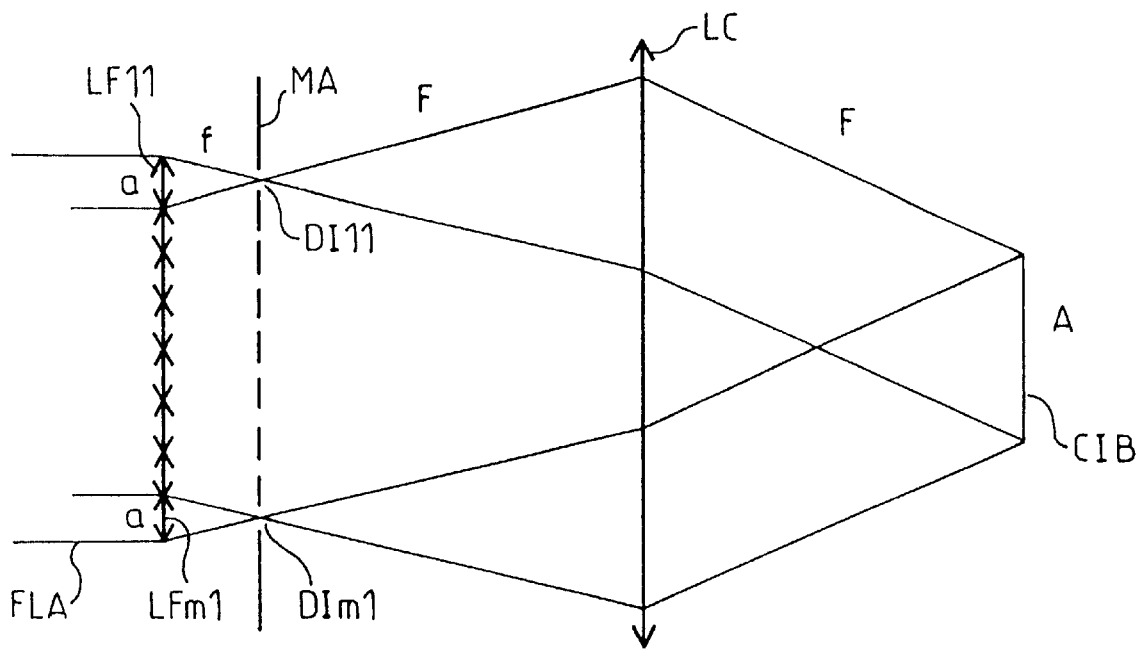
FIG. 1 is a schematic representation of a homogenizer device of the prior art.

In FIG. 1, the reference FLA designates a laser beam to be homogenized. This laser beam has an energy distribution which is non-uniform in cross section. It emanates for example from a laser or line of laser units placed in parallel and/or in series.

For example, this laser beam is intended for the laser annealing of amorphous silicon. One application consists of illuminating a large panel of amorphous silicon for the manufacture of flat liquid crystal screens. This laser beam is applied to the target plane CIB carrying the sample to be treated.

In a known fashion, for example as described in the document JP-A-01 286 478, the optical device for homogenizing a laser beam comprises m×n contiguous convergent front lenses LF, disposed in m rows and n columns perpendicularly (transversely) to the direction of propagation of the laser beam to be treated. m and n are integer numbers, for example m and n are equal to 7. The front lenses are arranged in a straight or oblique rectangular matrix. For example, they are evenly distributed within a rectangle or parallelogram.

These lenses split the laser beam FLA into m×n laser beams each having a substantially uniform cross section and a substantially homogeneous energy distribution.

A convergent collection lens LC is provided, disposed perpendicularly to the direction of propagation of the laser beam, downstream of the front lenses LF in the direction of travel of the laser beam. This collection lens is able to focus, in the target plane CIB, the beams coming from the front lenses.

M×n diaphragms DI can be associated respectively with the m×n front lenses. Each diaphragm is disposed substantially in the object focal plane of the associated lens and receives the laser beam coming from the associated front lens in order to filter it spatially.

The reference "a" designates the width of a front lens LF. The reference f designates the focal distance (close to the draw tube) between a front lens and the associated diaphragm DI. The reference F designates the distance (which can be different from the focal distance) between a diaphragm DI and the collection lens LC. The reference A designates the width of the homogenized laser beam obtained by the homogenizer HO at the plane CIB according to the invention. The dimension A is equal to a×F/f.

Each diaphragm DI comprises an opening of chosen shape and dimensions, for example circular. A support or mask MA holds the plurality of diaphragms.

The front lenses are for example of the convex/plane, biconvex or convex/concave type.

It is arranged so that the cross section of the laser beam coming from each front lens, whose shape is determined by the shape of the lenses, is rectangular or hexagonal, downstream of the diaphragms.

When the collection lens LC is of small diameter, the optical device is less expensive and has fewer optical aberations than with a large collection lens.

Figure 2:
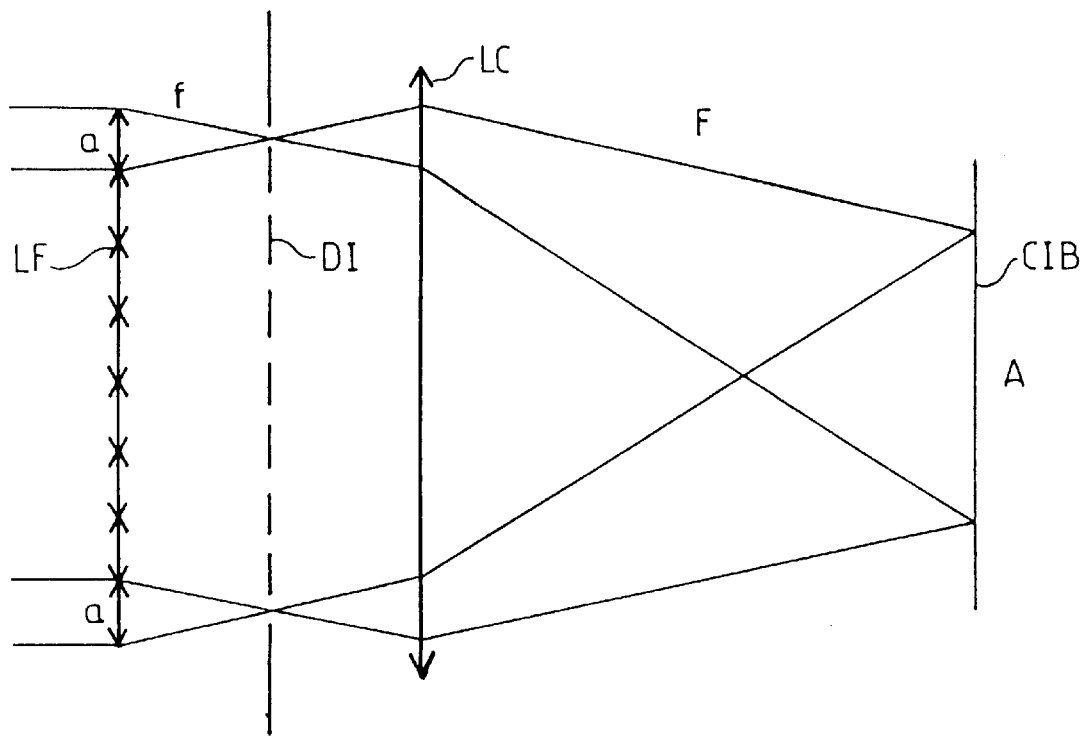
FIG. 2 is a variant of the homogenizer.

In FIG. 2, the collection lens LC is disposed so that the focal plane of the lenses LF is not merged with that of the collection lens LC. This variant confers a reduction in bulk of the homogenizing device.

The path of the light rays shows here that the homogenizing device is not necessarily afocal.

Figure 3:
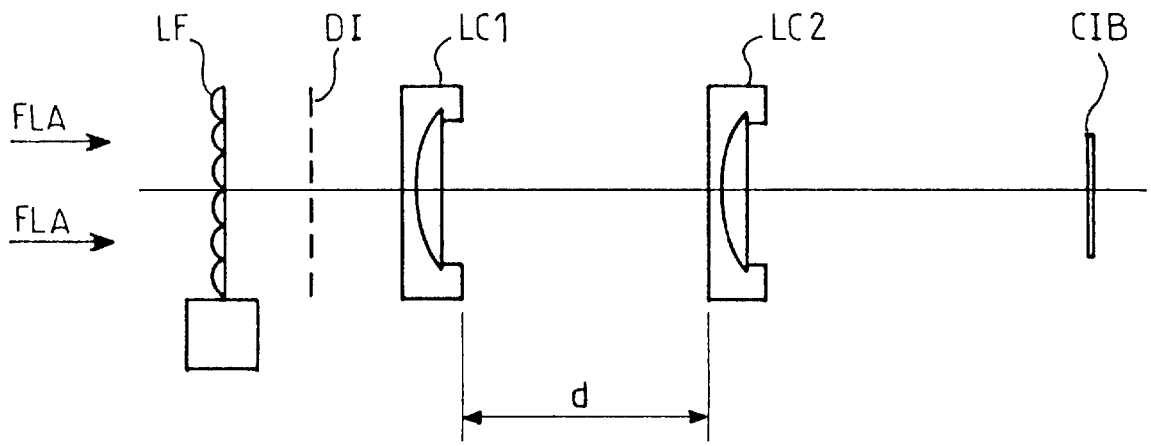
FIG. 3 is a homogenizer with two collection lenses.

With reference to FIG. 3, the collection lens LC is replaced by two convergent lenses LC1 and LC2, disposed perpendicularly to the direction of propagation of the laser beam, downstream of the front lenses LF and associated diaphragms DI.

Highly advantageously, these collection lenses LC1 and LC2 are able to move in translation along the optical axis.

The distance d between the two lenses LC1 and LC2 is varied in order to vary the resulting focal distance and obtain, at the target plane CIB, a size of homogenized beam which is suited to the chosen application, for example the size of the panels to be treated in the case of the annealing of amorphous silicon.

It should be noted that the other optical elements, namely the front lenses LF, the diaphragms DI and the target plane CIB, can also be movable in translation along the optical axis.

The choice of the relative distances between the different optical elements makes it possible not only to adapt the size of the homogenized laser beam to the chosen application (a possibility of choosing the magnification by varying the distance d), but also to reduce the bulk of the homogenizing device.

It should also be noted that the choice of the distance d also makes it possible to adjust the energy per unit surface delivered by the laser beam, as described in the patent application filed by the Applicant for "Method and device for controlling a laser source with several laser units in order to optimize laser surface treatment", already mentioned above.

Figure 4:
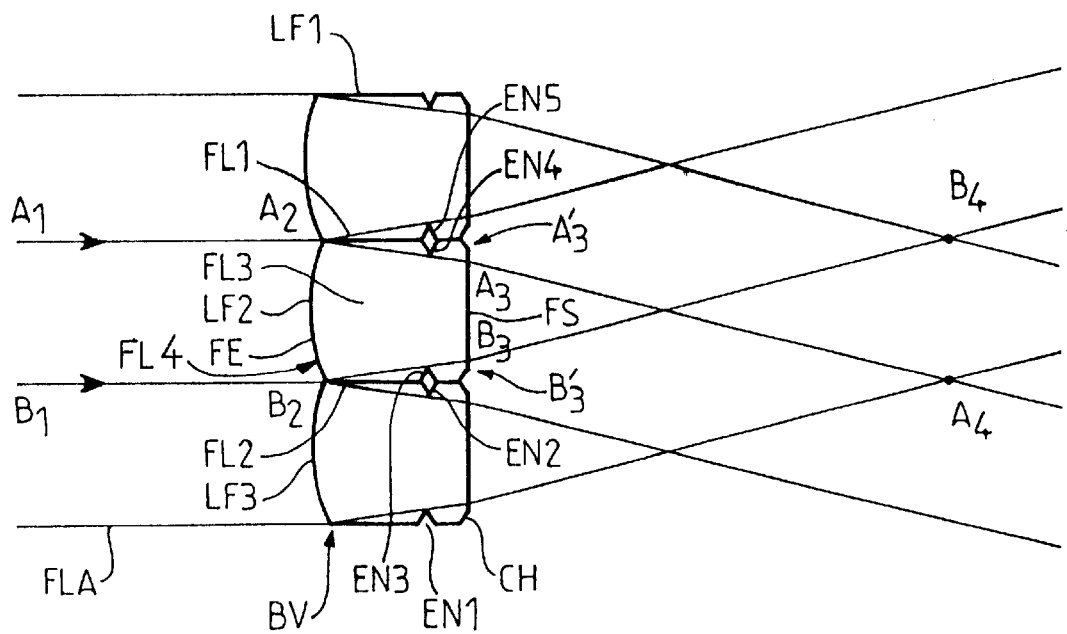
FIG. 4 illustrates an assembly of the front lenses of the homogenizer.

FIG. 4 depicts the path of several beams through several front lenses LF1–LF3 on the same row m. In order to facilitate an understanding of the invention, only three front lenses are shown diagrammatically, alongside each other. These front lenses are for example of convex/plane type. They are of parallelepipedal shape overall, with an entrance face FE, an exit face FS and four lateral faces FL1 to FL4. The convex part receives the laser beam to be treated FLA. One lateral face of a front lens is defined for example by the points A2, A'3, B'3 and B2 for the lateral face FL3 of the central lens LF2.

The laser beam to be treated, coming from the point A1, is applied to the central lens LF2 at the point A2. This beam passes through the front lens LF2 as far as the point A3, and is then routed towards the point A4. It should be noted that the point A3 is slightly offset with respect to the point A'3.

The convex part of a front lens comprises here two sharp edges such as BV.

The front lens LF2 comprises a shallow groove EN4 formed transversely in the lateral face FL1.

Likewise, the front lens LF2 comprises a shallow groove EN3 formed transversely in the lateral face FL2.

The grooves are preferably formed close to the exit face of the front lens.

The same applies to the other front lenses.

The two adjacent front lenses LF2 and LF3 are applied against each other. The cooperation of the respective grooves EN3 and EN2 enables the said lenses to be bonded by applying adhesive in the said grooves EN3 and EN2, without interfering with the optical properties of the laser beams passing through the said front lenses LF2 and LF3.

The path of the beam B1 through the central front lens LF2 passes through the points B2, B3 and B4.

It should be noted that the light path is not disturbed by the grooves EN1–EN5 and bevels CH.

Other means of assembling the lenses are possible according to the international patent application entitled "Optical device for homogenizing a laser beam", filed by the Applicant on the same date as the present application, and the disclosure of which is incorporated herein by reference.

The front lenses are rectangular or hexagonal in shape overall, with sides with a length of around 1 cm.

For example, the beam to be homogenized FLA is rectangular with sides of around 5 to 8 cm.

According to the invention, the laser beams divided by the front lenses are transferred and distributed towards the collection lens by means of optical transmission means such as optical fibres.

Figure 5:
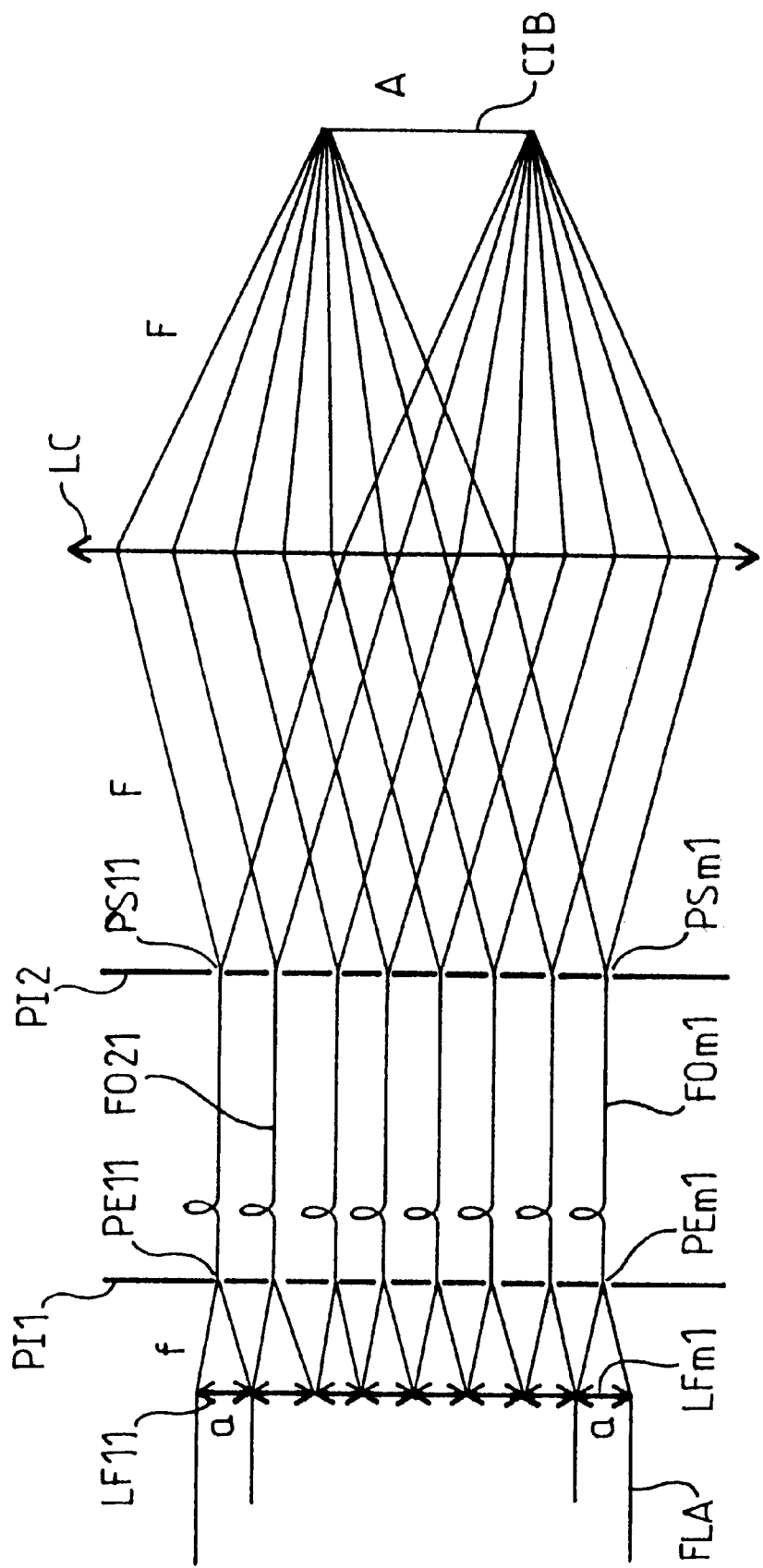
FIG. 5 depicts schematically the plurality of optical fibres receiving the laser beams divided by the front lenses in order to route them towards the collection lens according to the invention.

With reference to FIG. 5, the optical transmission means comprise a plurality of optical fibres $FO_{21}$–$FO_{ml}$ of indices i and j, able to transfer individually the laser beams coming from a plurality of entrance pupils $PE_{11}$–$PE_{ml}$ of indices m and n associated with the plurality of front lenes LF of indices m and n to a plurality of exit pupils $PS_{11}$–$PS_{ml}$ of indices k and l.

Indices m and n or k and l mean a bidimensional matrix arranged in m columns (or k) and n rows (or l). The indices i and j vary here respectively from 1 to m and from 1 to n.

The plurality of entrance pupils $PE_{11}$–$PE_{ml}$ is situated on an intermediate plane PI1 disposed in the focal plane of the front lenses $LF_{11}$–$LF_{ml}$.

The plurality of exit pupils $PS_{11}$–$PS_{ml}$ of indices k and l is disposed on an intermediate plane PI2, which can be distinct from the intermediate plane PI1 or superimposed thereon.

It should be noted that the entrance and/or exit pupils may or may not be given physical form. Giving physical form makes it possible to improve the spatial filtering. Moreover, the optical correspondence between the entrance pupils and the exit pupils is here advantageously bi-unique.

It should be noted here that each optical fibre FO for its part contributes to the transfer of a portion of the laser energy. In the case of a high-power laser, the device according to the invention thus makes it possible to divide and transfer a high-power laser energy into a plurality of portions of energy of lower power. The result is an elimination of the damage which can be caused by the effects of the high-power laser, notably on the optical elements of the device.

It may be advantageous for these optical fibres $FO_{21}$–$FO_{ml}$ to be arranged in a beam which is at least partly crossed. That is to say some at least of the fibres of indices i, j each connect an exit pupil $PS_{11}$–$PS_{ml}$ which does not have the same values of i and/or j. In principle these crossings are arranged so that any exit pupil remains fed from one of the entrance pupils.

Figure 6:
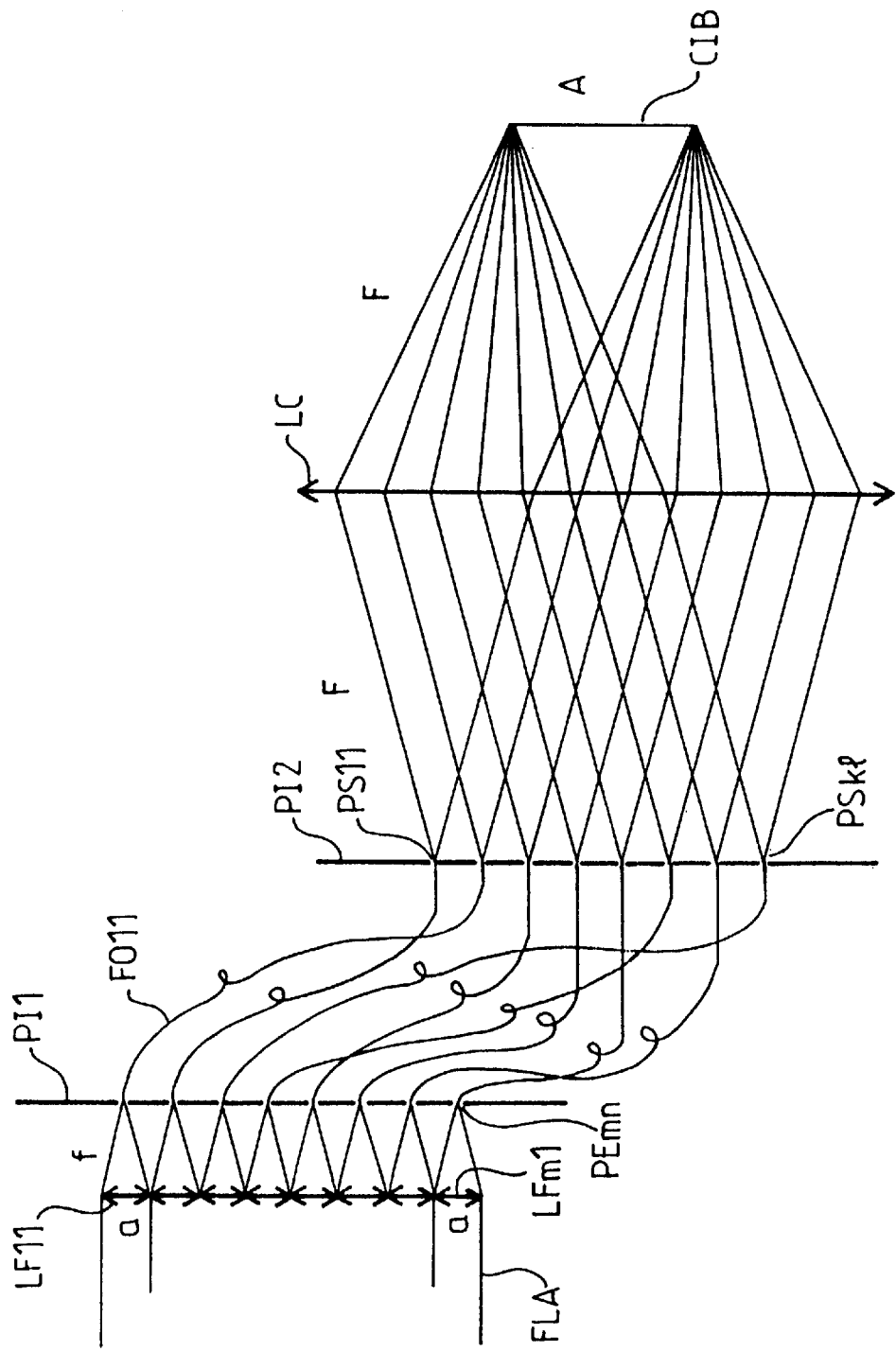
FIG. 6 depicts schematically the distribution of the laser beams divided by the front lenses in a crossed distribution of the optical fibres according to the invention.

In other words, the bundle of fibres collecting the energies of the lenses $LF_{ij}$ can distribute them in a distribution $PS_{kl}$ where at least some of the k and l are different from the i and j. This makes it possible to bring the distribution of energy at the exit even closer to the desired characteristics for it (FIG. 6).

It should be noted that the optical fibres also make it possible to illuminate a target plane CIB situated outside the optical axis of the laser beams FLA.

In this regard, it is a question in the following of homogenizing the laser beam obtained at the exit. Although important applications entail the obtaining of a beam whose energy density per unit surface is uniform in cross section, it is clear that the word "homogenizing" does not necessarily imply equality of the energy density over the entire cross section, but on the contrary extends to obtaining any desired distribution of this energy density.

Figure 7:
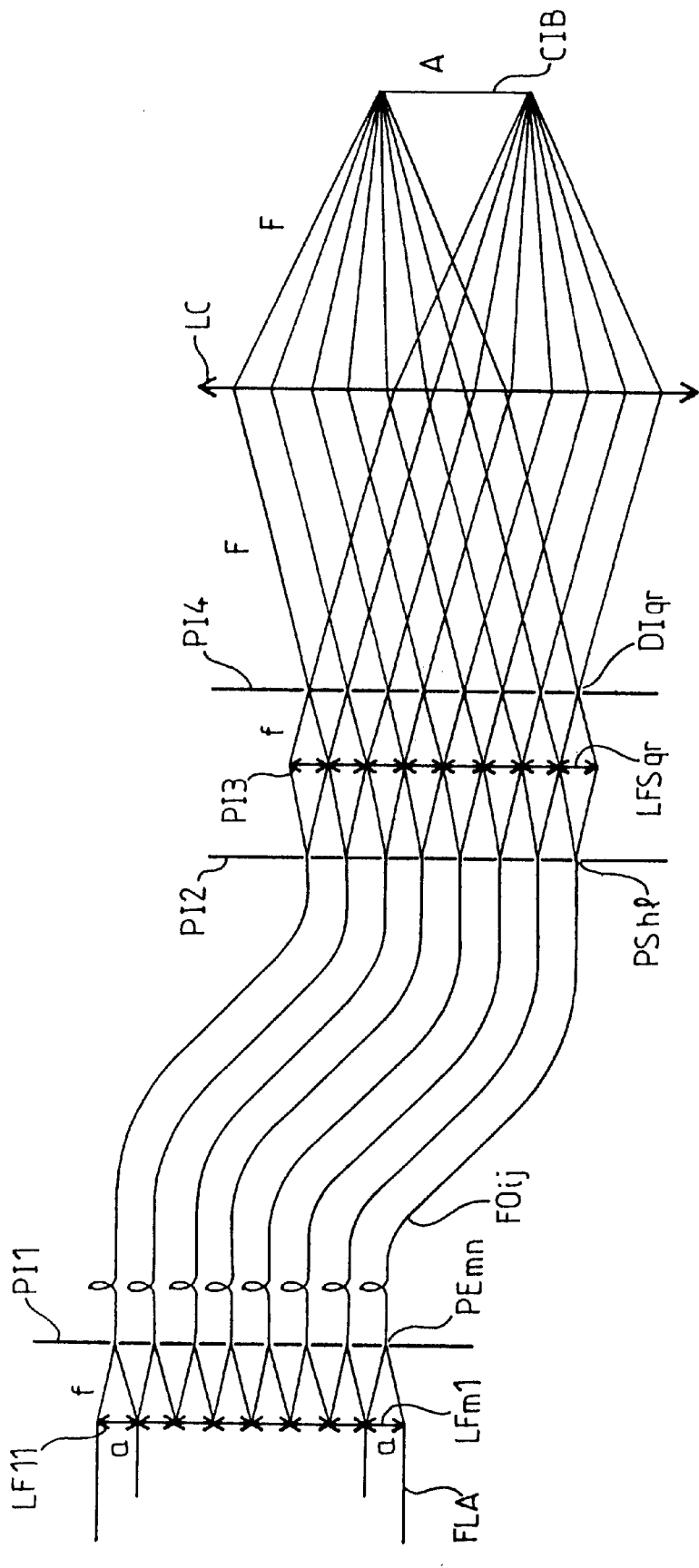
FIG. 7 depicts a variant of the device described with reference to FIG. 5 in which the laser beams divided by the front lenses and distributed by the optical fibres are divided once again by a plurality of additional front lenses according to the invention.

In a variant, it may be necessary to divide the laser beams once again in order to improve their homogeneity still further. Under these conditions (FIG. 7), the device according to the invention also comprises an intermediate plane PI3 having a plurality of additional front lenses LFS of indices q and r, disposed in q rows and r columns, perpendicularly to the direction of propagation of the laser beams coming from the plurality of exit pupils $PS_{kl}$. This plurality of additional front lenses receives the laser beams coming from the plurality of exit pupils $PS_{kl}$ in order to divide each of them into q.r laser beams each having a substantially uniform transverse section and a substantially homogeneous energy distribution.

The collection lens or lenses collect(s), in the chosen plane CIB, the laser beams thus divided by the additional front lenses.

The laser beams coming from the exit pupils $PS_{hl}$ are divided by the additional front lenses LFSqr in a distribution where at least some of the indices h and l are different from the indices q and r.

Advantageously, an intermediate plane PI4 has a plurality of diaphragms DI of indices q and r. The diaphragms DI of indices q and r receive the laser beams of indices q and r coming from the plurality of additional front lenses LFS in order to filter them spatially.

The optical fibres can be long or short. For example, they have a diameter of around 125 μm (the core of the fibre).

For a core of 125 μm, a short fibre is less than 1 meter long. It preserves the shape of the cross section of the beam which enters it.

For a core of 125 μm, a long fibre is longer than 1 meter. It depolarises the laser beam which enters it and emits a light beam with symmetry of revolution.

Figure 8:
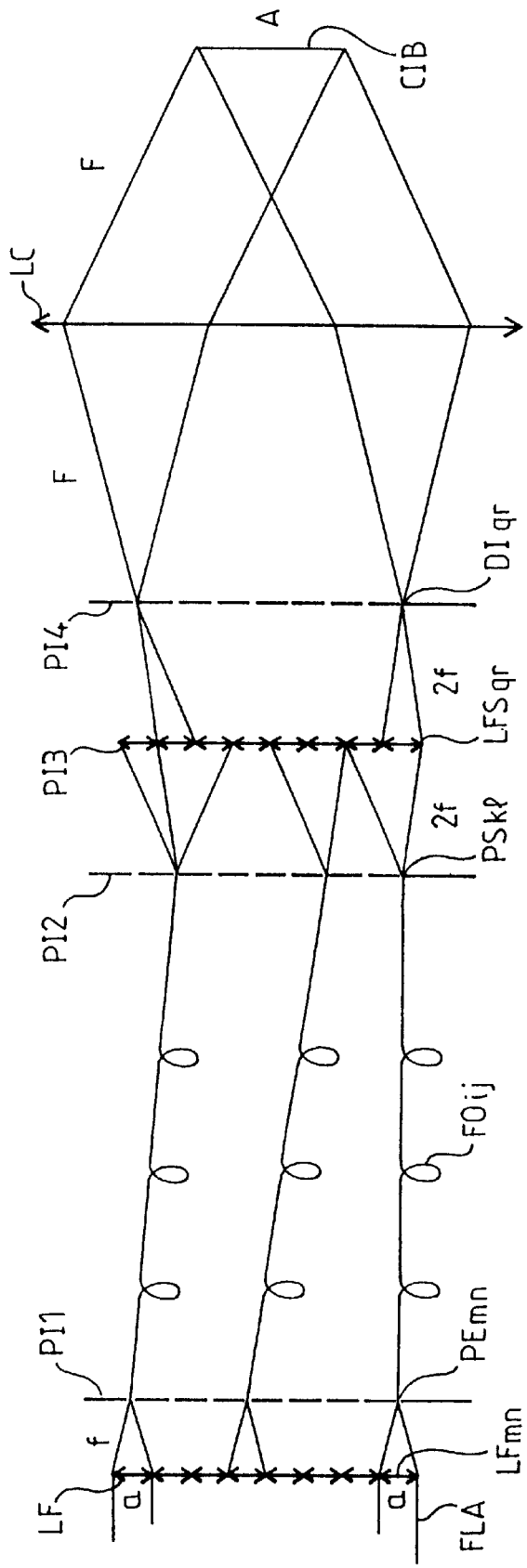
FIG. 8 is a variant of the device described with reference to FIG. 6 in which the laser beams divided by the front lenses and distributed by the optical fibres are divided once again by a plurality of additional front lenses.

With reference to FIG. 8, the additional front lenses LFS are disposed at a distance 2f from the intermediate plane PI2 and from the intermediate plane PI4. Under these circumstances, the laser beams coming from the exit pupils PS illuminate several additional front lenses.

We claim:

1. An optical device for optically treating an entrance laser beam comprising:

a matrix of m×n contiguous convergent front lenses disposed in m rows and n columns on a plane perpendicular to a direction of propagation of the entrance laser beam, and suitable for dividing the entrance laser beam into m×n elementary laser beams each having an elementary transverse section of chosen geometric shape, and a spatial distribution of the light intensity which is substantially homogenous in the elementary transverse section;

at least one convergent collection lens disposed on a plane perpendicular to the direction of propagation of the entrance laser beam, downstream of the contiguous convergent front lenses in the direction of propagation of the entrance laser beam, the at least one convergent collection lens being suitable for collecting, in a chosen plane, the elementary laser beams coming from the contiguous convergent front lenses to obtain an exit beam having a desired distribution of an energy density per unit surface in cross section;

a plurality of optical fibres, each of the plurality of optical fibres comprising a first end and a second end opposite to the first end, the first optical fibre ends being disposed in a first matrix-type arrangement of i rows and j columns in a first intermediate plane, consisting of a focal plane of the contiguous convergent front lenses, with each of the first optical fibre ends situated substantially at a focusing point of a respective front lens, whilst the second optical fibre ends being disposed in a second bidimensional arrangement of chosen distribution in a second intermediate plane situated downstream of the focal plane of the contiguous convergent front lenses, the first and second optical fibre ends constituting respectively entrance pupils and exit pupils and the focusing lens, disposed downstream of the second intermediate plane, being able to collect the elementary laser beams coming from the plurality of exit pupils.

2. The optical device of claim 1 wherein the plurality of optical fibres possess a diameter of around 125 $\mu$m and a length less than 1 m.

3. The optical device of claim 1 wherein the plurality of optical fibres have a diameter of around 125 $\mu$m and a length greater than 1 m.

4. The optical device of claim 1 wherein the second bidimensional arrangement corresponds to a matrix of k rows and l columns.

5. The optical device of claim 4 wherein the plurality of optical fibres transmitting the elementary laser beams coming from the contiguous convergent front lenses are able to distribute them in a distribution in which at least some of indices k and l are different from indices i and j.

6. The optical device of claim 4 wherein the plurality of optical fibres transmitting the elementary laser beams coming from the contiguous convergent front lenses are able to distribute them in a distribution where indices k and l are identical to indices i and j.

7. The optical device of any one of the preceding claims further comprising a third intermediate plane disposed downstream of the second intermediate plane, having a plurality of contiguous additional front lenses, disposed in q rows and r columns, perpendicularly to a direction of propagation of the elementary laser beams coming from the plurality of exit pupils and suitable for receiving the elementary laser beams coming from the plurality of exit pupils, and to divide each of the elementary laser beams into q.r additional elementary laser beams each having an additional elementary transverse section of chosen geometric shape, and an energy distribution which is substantially homogenous in the additional elementary transverse section, the at least one convergent collection lens being suitable for collecting, in a chosen plane, the additional elementary laser beams coming from the plurality of contiguous additional front lenses.

8. The optical device of claim 7 wherein the plurality of contiguous additional front lenses dividing the additional elementary laser beams coming from the exit pupils are able to divide them in a distribution where at least some of indices k and l are different from indices q and r.

9. The optical device of claim 7 further comprising a fourth intermediate plane disposed downstream of the third intermediate plane, having a plurality of diaphragms suitable for receiving the q.r additional elementary laser beams coming from the plurality of continuous additional front lenses in order to filter them spatially.

10. The optical device of claim 1 wherein the first and second intermediate planes are distinct.

11. The optical device as in any of claims 1–6 or 10 wherein the contiguous convergent front lenses are connected to each other without interfering with an optical path of elementary laser beams which pass through them.

12. The optical device as in any of claims 1–6 or 10 wherein the at least one convergent collection lens comprises two collection lenses able to move in translation along an optical axis of the optical device in order to vary a resulting focal length.

* * * * *